Figure 1:
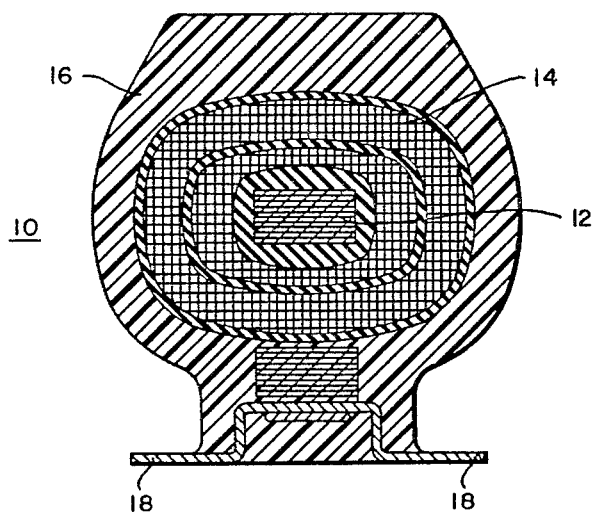

INVENTOR
William R. Thomas

United States Patent Office 3,380,963
Patented Apr. 30, 1968

3,380,963
BORON- AND NITROGEN-CONTAINING
CATALYST AND MIXTURES THEREOF
WITH AN EPOXY RESIN
William R. Thomas, LeRoy, N.Y., assignor to Westinghouse Electric Corporation, Pittsburgh, Pa., a corporation of Pennsylvania
Continuation-in-part of application Ser. No. 47,527, Aug. 4, 1960. This application Mar. 12, 1965, Ser. No. 444,897
15 Claims. (Cl. 260—47)

This application is a continuation-in-part of application Ser. No. 47,527, filed Aug. 4, 1960 now abandoned and assigned to the same assignee as this invention.

This invention relates to curing catalysts for glycidyl polyether resins, to mixtures of glycidyl polyether resins and said catalysts, and to electrical components insulated with the cured glycidyl polyethers.

Glycidyl polyethers, also known as epoxy or epoxide resins, have excellent chemical resistance, low moisture permeability, and superior adhesive properties, all of which make the resins particularly well suited for use as adhesive sealing compounds, casting resins, and surface coatings.

Generally, glycidyl polyethers have been cured to produce hardened resins by heating them in the presence of catalytic amounts of a hydrocarbon amine, an organic acid or an organic acid anhydride. Many disadvantages have resulted from such prior art curing practices.

The amine catalysts, such as diethylenetriamine and dimethylamine, are extremely fast acting catalysts when used in association with glycidyl polyethers. As a result, such resins must be used almost immediately after the catalyst has been admixed therewith. Any unused catalyzed resinous mixture must be discarded to prevent it from hardening within the mixing container. Furthermore, many of the amines which have been used heretofore are toxic and cause dermatitis, and certain of them have quite unpleasant odors.

Of the organic acid anhydride materials which can be used, maleic anhydride and phthalic anhydride have enjoyed widespread acceptance as curing catalysts for epoxy resins. Like the amine catalysts, however, the acid anhydrides when admixed with epoxy resins provide liquid mixtures having a relatively long shelf life, but they are vary slow curing. A further disadvantage of acid anhydride catalysts lies in the fact that they must be admixed with the resins at elevated temperatures to insure complete solution therein. On subsequent cooling, however, precipitation of the catalytic material frequency occurs.

An object of the present invention is to provide mixtures of an epoxy resin and/or an epoxy-novolak resin, and a curing catalyst, said curing catalyst comprising a complex of (1) at least one nitrogen coordinated boron compound and (2) a polyborate ester and/or a borate ester, said resin-catalyst mixtures being stable for prolonged periods at room temperature and being readily reactable at elevated temperatures to provide cured resinous products.

Another object of the present invention is to provide a curing catalyst for epoxy resins and epoxy-novolak resins comprised of a complex of (1) at least one nitrogen coordinated boron compound and (2) a borate ester and/or a polyborate ester.

A further object of this invention is to provide a process for curing epoxy resins and epoxy-novolak resins by heating the same at elevated temperatures in the presence of a curing catalyst comprising a complex of (1) at least one nitrogen coordinated boron compound and (2) a borate ester and/or a polyborate ester.

A still further object of this invention is to provide electrical members insulated with a resinous composition comprising the cured product obtained by heating and reacting an epoxy resin and/or an epoxy-novolak resin together with a catalyst comprising a complex including (1) at least one nitrogen coordinated boron compound and (2) a borate ester and/or a polyborate ester.

Other objects of the invention will, in part, be obvious and will, in part, appear hereinafter.

Figure 2:
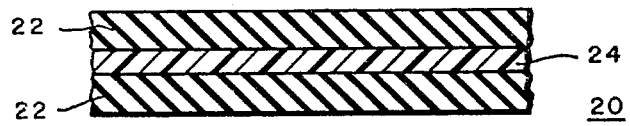

For a better understanding of the nature and objects of the invention, reference should be had to the following detailed description and drawing, in which:

FIGURE 1 is a side view in cross section of an electrical transformer insulated with a resin cured with the catalysts of this invention; and FIG. 2 is a cross-sectional view of a laminate formed by bonding together two sheets of a suitable material by an adhesive comprised of a resin cured with the catalysts of this invention.

In accordance with the present invention and in attainment of the foregoing objects, there is provided a curing catalyst for glycidyl polyether resins and glycidyl polyether-novolak resins, said catalyst comprising a complex of (a) from 1 to 2 mols of at least one boron compound selected from the group consisting of (i) polyborate esters having a formula selected from the group consisting of:

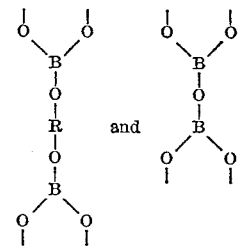

wherein the valence bonds at each end are satisfied by at least one radical selected from the group consisting of a bivalent R radical and a monovalent $R_1$ radical, wherein R is selected from the group consisting of polyhydric alcohols having two hydroxyl groups removed, and $R_1$ is selected from the group consisting of monohydric and polyhydric alcohols having one hydroxyl group removed, and (ii) borate esters having the structural formula:

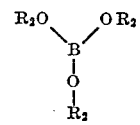

wherein $R_2$ is a radical selected from at least one of the group consisting of alkyl radicals, aryl radicals, cycloalkyl radicals and mixtures of two or more, and (b) from 1 to 3 mols of a nitrogen coordinated boron compound having the structural formula:

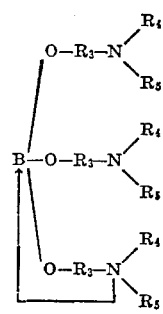

wherein $R_3$ is a bivalent radical selected from the group consisting of —$CH_2$—$CH_2$— and $$-CH-CH_2-\\ \phantom{-CH}|\\ \phantom{-CH}CH_3$$

and $R_4$ and $R_5$ are selected from the group consisting of hydrogen, alkyl radicals, aryl radicals, and cycloalkyl radicals. The complex obtained by reacting a borate ester or polyborate ester and a nitrogen coordinated boron compound such as those described above has the structural formula:

(1)

$$B\underset{\uparrow}{\overset{\diagup}{-}}\begin{matrix}O-R_3-N\rightarrow B\diagdown_{OR_2}^{OR_2}\\ |\phantom{O-R_3-N\rightarrow B}OR_2\\ |\phantom{O-R_3-N\rightarrow B}OR_2\\ O-R_3-N\rightarrow B-OR_2\\ |\phantom{O-R_3-N\rightarrow B}OR_2\\ O-R_3-N-\phantom{xx}\end{matrix}$$

where there were employed two mols of a borate ester and wherein the free nitrogen valence bonds are satisfied by hydrogen and/or alkyl, aryl, and cycloalkyl radicals (2)

$$B\underset{\uparrow}{-}\begin{matrix}O-R_3-N\rightarrow B\diagdown^{OR_2}\\ |\phantom{xxx}|\phantom{xx}\diagdown\\ |\phantom{xxx}O\phantom{xx}OR_2\\ |\phantom{xxx}|R\\ O-R_3-N\phantom{xx}|\\ |\phantom{xx}|O\diagup^{OR_2}\\ |\phantom{xx}|\diagup\\ |\phantom{xx}B\diagdown_{OR_2}\\ O-R_3-N-\end{matrix}$$

where there was employed one mol of a polyborate ester, or (3)

$$B\underset{\uparrow}{-}\begin{matrix}O-R_3-N\rightarrow B\diagdown^{O}\diagdown_{R_2}\\ |\phantom{xxx}|\phantom{x}\diagdown_O\diagup\\ |\phantom{xxx}|R\\ O-R_3-N\phantom{xx}|\\ |\phantom{xx}|O\diagup^{O}\diagdown_{R_2}\\ |\phantom{xx}B\diagdown_O\diagup\\ O-R_3-N-\end{matrix}$$

wherein $R_2$ is a divalent alkyl radical.

Epoxy and epoxy-novolak resins can be cured by admixing the same with from 0.5 to 50% by weight, based on the weight of resin, of the catalyst described herein. The preferred range of catalyst is from about 2% to 25%.

In accordance with still another aspect of the present invention there is provided an electrical member comprising an electrical conductor and electrical apparatus insulated with a hardened composition comprising either an epoxy resin, an epoxy-novolak resin or mixtures thereof and cured with the catalyst described herein.

In preparing the catalyst, the desired results are achieved when the nitrogen coordinated boron compounds and borate esters or polyborate esters are combined in such a ratio as to provide one atom of nitrogen per atom of boron in the finished catalyst thereby coordinating all available nitrogen atoms with all available boron atoms. Thus, for example, a complex comprising one mol of polyborate and one mol of nitrogen coordinated boron compound will provide one atom of nitrogen per atom of boron. Likewise, a complex comprising two mols of borate ester and one mol of nitrogen coordinated boron invention have extremely long shelf life at room temperature compound will provide one atom of nitrogen per atom of boron.

Mixtures of glycidyl polyethers and glycidyl polyether-novolak in combination with the curing agents of the tures. Thus, such mixtures do not gel even after several months storage at room temperature (20° C.–30° C.) yet will cure to the solid state after only a few hours heating at about 100° C. or after having been heated to a temperature of about 150° C. for a period of about one hour.

A further advantage of this invention resides in the fact that the curing catalyst is a liquid which is easy to dissolve in the glycidyl polyether or glycidyl polyether-novolak. In many cases, the curing catalyst, since it is a liquid, helps reduce the viscosity of the glycidyl polyethers thereby permitting more complete penetration and impregnation of electrical apparatus to which the resin-catalyst mixture may be applied.

The resinous epoxy compositions which can be cured using the catalyst of this invention can be prepared, in accordance with one preferred procedure, by reacting predetermined amounts of at least one polyhydric phenol or polyhydric alcohol and at least one iphalohydrin in an alkaline medium. Phenols which are suitable for use in preparing such resinous polymeric epoxides include those which contain at least two phenolic hydroxide groups per molecule. Polynuclear phenols which have been found to be particularly suitable include those wherein the phenol nuclei are joined by carbon bridges, such for example as 4,4' - dihydroxy - diphenyl - dimethyl - methane (referred to hereinafter as bis-phenol "A"), 4,4'-dihydroxy-diphenyl-methyl-methane and 4,4' - dihydroxy-diphenyl-methane (referred to hereinafter as bis-phenol "F"). In admixture with the named polynuclear phenols, use also can be made of those polynuclear phenols wherein the phenolic nuclei are joined by sulfur bridges, such for example, as 4,4'-dihydroxy-diphenyl-sulfone. Polyhydric alcohols are glycerol, glycol, propylene glycol and 1,5-pentanediol.

While it is preferred to use epichlorohydrin as the epihalohydrin in the preparation of the resinous polymeric epoxide starting material of the present invention, other epihalohydrins, for example, epibromohydrin and the like also can be used advantageously.

In the preparation of the resinous polymeric epoxides, aqueous alkali is employed to combine with the halogen of the epichlorohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide can be employed although it is preferred to use sodium hydroxide since it is relatively inexpensive.

The product of the reaction, instead of being a single simple compound, is generally a complex mixture of glycidyl polyethers, but the principal product can be represented by the formula:

$$\overset{O}{\underset{\diagdown}{CH_2-}}CH-CH_2-O(R-O-CH_2-CHOH-CH_2-O)_nR-O-CH_2-\overset{O}{\underset{\diagdown}{CH}}-CH_2$$

wherein $n$ is an integer of the series 0, 1, 2, 3 and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it can contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two ore more aromatic hydrocarbon radicals alternating with glyceryl groups in a chain which are linked together by intervening ethereal oxygen atoms.

The resinous polymeric epoxide, or glycidyl polyether of a dihydric phenol suitable for use in this invention has a 1,2-epoxy equivalency greater than 1.0. By epoxy equivalency reference is made to the average number of 1,2-epoxide groups:

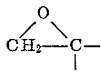

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases, it is a value greater than 1.0. The 1,2-epoxy equivalency of the polyethers is thus a value between 1.0 and 2.0.

The 1,2-epoxide value of the glycidyl polyether is determined by heating a weighted sample of the ether with an excess of 0.2 N pyridinium chloride in chloroform solution at the boiling point under reflux for two hours whereby the pyridinium chloride hydrochlorinates the epoxy groups to the chlorohydrin groups. After cooling, the excess pyridinium chloride is back-titrated with 0.1 N sodium hydroxide in methanol to the phenolphthalein end point.

In some cases the epoxide equivalency is given in terms of epoxide equivalents in 100 grams of the resin, and this can vary from about 0.019 to 1.5. Also, epoxy value or epoxide equivalent is often expressed as the number of grams of resin containing one equivalent of epoxide.

Resinous polymeric epoxides or glycidyl polyethers suitable for use in accordance with this invention can be prepared by admixing and reacting from one to ten mol proportions of an epihalohydrin, preferably epichlorohydrin, with from one to three mol proportions of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" can be admixed and the epichlorohydrin added thereto, or an aqueous solution of alkali and bis-phenol "A" can be added to the epichlorohydrin. In any case, the mixture is heated in the vessel to a temperature within the range of about 80° C. to 110° C. for a period of time varying from about one-half hour to three hours, or more, depending on the quantity of reactants used.

Upon completion of heating, the reaction mixture separates into layers. The upper aqueous layer is withdrawn and discarded, and the lower layer, containing the desired epoxy, is washed with hot water to remove unreacted alkali and halogen salts, in this case, sodium chloride. If desired, dilute acids, for example, acetic acid or hydrochloric acid, can be employed during the washing procedure to neutralize the excess alkali.

The following are specific examples of some commercially available epoxy resins;

Example I

An epoxide resin having a melting point of 8–12° C., an epoxide equivalency of 190 to 210, and which has a viscosity of Z–5 to Z–6+ on the Gardner-Holdt scale. This resin is available commercially as Epon 828;

Example II

An epoxide resin having a melting point of 64–67° C., an epoxide equivalency of 450 to 525, and a 40% solution in butyl Carbitol has a viscosity of C–G on the Gardner-Holdt scale. This epoxy resin is commercially available as Epon 1001;

Example III

An epoxide resin having a melting point of 97–103° C., an epoxide equivalency of 905 to 985, and a 40% solution in butyl Carbitol has a viscosity of R–T on the Gardner-Holdt scale. This resin is available commercially as Epon 1004; and Example IV An epoxide resin having a melting point of about 11° C. to 15° C., a specific gravity (23° C./23° C.) of from 1.16 to 1.18, and epoxy value of from 0.440 to 0.480 epoxide equivalents per 100 grams of resin, and a viscosity of Z–6 on the Gardner-Holdt scale. This resin is available commercially as Araldite 6020.

The glycidyl polyether-novolak resins suitable for combining with and for curing by the catalysts in accordance with this invention are prepared by condensing an epihalohydrin with a novolak resin of an aldehyde and a monohydric mononuclear alkyl phenol containing at least four carbon atoms in the alkyl group, which novolak resin contains about three to twelve phenolic hydroxyl groups per average molecule. The term "novolak" as used herein refers to fusible phenol-aldehyde resins prepared by reacting at least one phenol with at least one aldehyde in the ratio of 1 mol phenol to from about 0.5 to 0.85 mol of aldehyde using an acidic catalyst. The condensation is effected by mixing the novolak resin with at least 3 mols of an epihalohydrin, such as epichlorohydrin, per phenolic hydroxyl equivalent of novolak resin and with addition of about 1 mol of alkali metal hydroxide per phenolic hydroxyl equivalent of novolak resin. The reaction mixture is maintained within the range of about 60° C. to 150° C. during the ensuing reaction. Upon completion of the reaction, the formed alkali metal salt and any unreacted hydroxide are removed from the resulting epoxy-novolak resin as are unreacted epichlorohydrin and water also, the resultant epoxy-novolak, in the form of a viscous liquid or solid, is separated from the reaction mixture and can be purified, if required. The resultant resin generally will be used in solvent solution.

Although novolak resins from formaldehyde are generally preferred for use in this invention, novolak resins from any other aldehydes such as, for example, acetaldehyde, chloraldehyde, butyraldehyde, propionaldehyde, and furfuraldehyde can be used also. In order that the epoxy-novolak resin will have the desired degree of solubility in organic solvent such as paraffinic hydrocarbons, it is essential that the novolak resin be derived from an alkyl phenol containing from 4 to 18 carbon atoms in the alkyl group. Although the alkyl group can be straight chained, it is generally preferred to have the novolak resin of a phenol containing a branch chain alkyl substituent. Among representative alkyl phenols from which the novolak resin can be derived for use in preparing the epoxy-novolak resin are butylphenol, tertiary butylphenol, tertiary amylphenol, hexylphenol, 2-ethylhexylphenol, diisobutylphenol, nonylphenol, isononylphenol, decylphenol, dodecylphenol, isododecylphenol, 3-pentadecylphenol, and the like. It is preferred, but not essential, that the alkyl substituent be linked to the para-carbon atom of the parent phenolic nucleus. For use in preparing the epoxy-novolaks of this invention, a novolak resin of a substance of the group consisting of p-alkyl phenol, o-alkyl phenol and mixtures thereof is suitable when the alkyl group contain at least four carbon atoms.

The epoxy-novolak resin is formed by adding the novolak resin to the epichlorohydrin and then adding an alkali metal hydroxide to the mixture so as to effect the desired condensation reaction. About 1 mol of alkali metal hydroxide such as sodium or potassium hydroxide is used per one phenolic hydroxyl equivalent of the novolak resin. The amount of alkali metal hydroxide need not be exactly 1 mol per equivalent of novolak resin although, in general, it is preferred that any variation be toward an excess such as use of 1.02, 1.05, or 1.1 mols of hydroxide per equivalent of novolak resin. The alkali metal hydroxide can be added continuously or intermittently during the course of the reaction. The addition of solid alkali metal hydroxide in the form of pellets or flakes is convenient. The rate of addition is desirably effected gradually so as to avoid having the reaction mixture become too strongly basic or acidic. During the reaction, the reaction mixture is heated or cooled so that the temperature is maintained within the range of about 60° C. to 150° C. Heat is helpful in getting the reaction under way, but since the reaction is quite exothermic, cooling is generally required after initiation. It is convenient to effect the reaction in a vessel equipped with heating means and a reflux condenser. After the reaction is under way, the reaction mixture boils with heat removal and temperature control being effected by the refluxing of epichlorohydrin and formed water. The reaction is preferably effected at a temperature of about 75° C. to 110° C. and is usually conducted at about 95° C. to 100° C.

Although water is one of the products of the condensation reaction, it is useful to add a small quantity to the initial mixture of reactants. For this purpose, water in an amount of about 0.1% to 2% by weight of the sum of the weights of the epichlorohydrin and the novolak resin is suitable.

Upon completion of the condensation reaction of the epichlorohydrin with the novolak resin and the alkali metal hydroxide, the formed epoxy-novolak resin is separated from the reaction mixture. The separation involves removal from the epoxy-novolak resin from the unreacted excess epichlorohydrin, formed water, alkali metal chloride and any excess alkali metal hydroxide. It is convenient to first distill epichlorohydrin and water from the mixture. The residue is then dissolved in a solvent for the epoxy-novolak resin, but a non-solvent for the alkali metal chloride such as a liquid distilled hydrocarbon, for example, benzene, toluene, xylene, hexane, heptane, octane, or petroleum naptha, the solvent being used in an amount of about one-half or twice the weight of epoxy-novolak resin. This causes the alkali metal chloride to precipitate from the solution. The salt is filtered or centrifuged from the mixture. The filtrate can next be washed with water to insure removal of inorganic and any other water soluble impurities although this operation is not essential. The solvent is removed from the filtrate by distillation, preferably under sub-atmospheric pressure such as down to a pressure of 1 to 10 millimeters Hg.

The obtained epoxy- novolak resins can vary from very viscous liquids to solids at normal temperatures (20° C.). Even the normal solid resins are fusible. The resins have a very complicated chemical structure. Analysis indicated that the majority such as about 60 to 90 or more percent of the hydrogen atoms of the phenolic hydroxyl group of the original novolak resin are replaced by glycidyl radicals. The epoxy-novolak resins also contain an appreciable proportion of alcoholic hydroxyl groups which are largely present in 2,3-dihydroxypropyl radicals that have replaced hydrogen atoms of phenolic hydroxyl groups of the original novolak resin. A small proportion of chlorine is contained in the resin, some of which is present in 3-chloro-2-hydroxy-propyl groups and some in more complicated groups which are 3-chloro-2-(3-chloro-2-hydroxypropyloxy) propyl and 3-chloro-2-(2,3-epoxypropyloxy) propyl radicals linked to the phenolic ether oxygen atoms in the epoxy resin. The product may contain an insignificant amount of phenolic hydroxyl group, i.e., at most, less than about .3 per average molecule.

The nitrogen coordinated boron compound used in this invention has the formula:

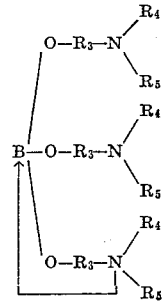

wherein $R_3$ is a bivalent radical selected from the group consisting of $-CH_2-CH_2-$ (ethylene radical) and $$-CH-CH_2-$$
$$\phantom{-}|$$
$$CH_3$$

(isopropylene radical). $R_4$ and $R_5$ are selected from the group consisting of hydrogen; alkyl radicals such as methyl, ethyl, propyl, isopropyl, n-butyl, sec-butyl, iso-butyl, pentyl, and hexyl; cycloalkyl radicals such as cyclopentyl and cyclohexyl, and aryl radicals such as phenyl, methyl phenyl, dimethyl phenyl, benzyl, and chlorophenyl.

The nitrogen coordinated boron compounds can be prepared by heating to reaction about three mols of a monoalkanolamine and 1 mol of boric acid or an ester of boric acid.

Suitable monoalkanolamines have the structural formula:

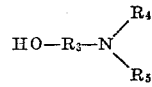

wherein $R_3$ is a radical selected from the group consisting of $-CH_2-CH_2-$ and $$-CH-CH_2-$$
$$\phantom{-}|$$
$$CH_3$$

$R_4$ and $R_5$ are selected from the group consisting of hydrogen; alkyl radicals, including methyl, ethyl, propyl, isopropyl, n-butyl, pentyl, hexyl, and isobutyl; cycloalkyl radicals, including cyclopentyl and cyclohexyl; and aryl radicals, including phenyl, methyl phenyl, dimethyl, phenyl, benzyl, and chlorophenyl.

Specific examples of monoalkanolamines include monoethanolamine, N,N-dimethyl ethanolamine, N,N-diethyl-ethanol-amine. N-methyl ethanolamine, N-ethyl ethanolamine, monoisopropanolamine, N,N-dimethyl isopropanolamine, and N,N-diethyl isopropanolamine.

The esters of boric acid, also termed borates, used in reaction with the monoalkanolamine, have the structural formula:

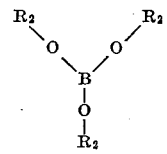

wherein $R_2$ is an alkyl radical, including methyl, ethyl, propyl, isopropyl, n-butyl, sec-butyl, iso-butyl, pentyl, and hexyl; and aryl radical, including phenyl, methylphenyl, benzyl, and chlorophenyl; and a cycloalkyl radical, including cyclopentyl and cyclohexyl. A mixture of two or three different radicals can be present in a single borate ester. Specific examples of suitable borate esters include methyl borate, ethyl borate, n-propyl borate, isopropyl borate, n-butyl borate, cyclohexyl borate, phenyl borate, benzyl borate, tri-o-cresyl borate, and tri-m-cresyl borate.

The nitrogen coordinated boron compounds referred to above and the method of preparing the same are more fully described in U.S. patent application Ser. No. 46,631, filed Aug. 4, 1960, now U.S. Patent No. 3,072,737. Reference is made to this patent for a more complete description of the method of making the nitrogen coordinated boron compounds employed in this invention.

The following example is illustrative of a method of preparing a nitrogen coordinated boron compound for use in this invention.

Example V

Into a reaction vessel fitted with stirred, thermometer and fractionating column, there are introduced about 3 mols of N,N-dimethylethanolamine and 1 mol of trimethyl borate. The reactants are heated slowly to a temperature of about 110° C. and maintained at this temperature until about 3 mols of methanol, one of the reaction products, are removed by distillation through the fractionating column. The remaining reaction product is recovered by vacuum distillation at a vacuum of 4 mm. of mercury and at a temperature of about 134° C. The recovered liquid reaction product is tri[2-dimethylaminoethanol] borate and has the formula:

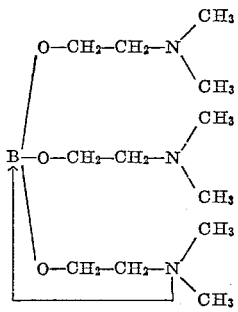

Other nitrogen coordinated boron compounds suitable for use in this invention can be prepared in a manner similar to that of Example V. Examples of such compounds include tri[2-aminoethanol] borate which has the formula:

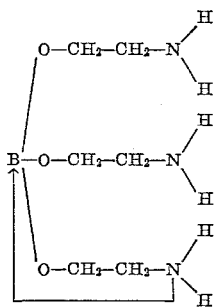

and tri[-2aminomethylethanol] borate which has the formula

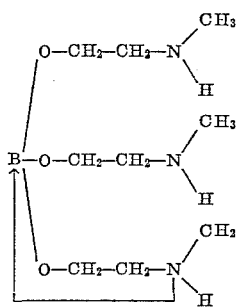

The borate esters which can be used as a portion of the curing catalyst of this invention are well known in the art and include those materials having the formula:

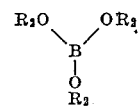

wherein $R_2$ is selected from the group consisting of alkyl radicals, including methyl, ethyl, propyl, isopropyl, n-butyl, t-butyl, pentyl and hexyl; cycloalkyl radicals including cyclopentyl and cyclohexyl; and aryl radicals including phenyl, methyl phenyl, benzyl, and chlorophenyl. Specific examples of suitable borate esters include methyl, borate, ethyl borate, n-propyl borate, isopropyl borate, triphenyl borate, tribenzyl borate, n-butyl borate, and tri-m-cresyl borate.

The polyborate esters which can be used as a portion of the curing catalyst of this invention are well known in the art and include those materials having the following structural formulae:

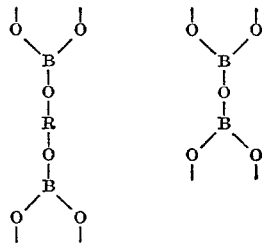

where the valence bonds at each end are satisfied by at least one radical selected from the group consisting of a bivalent R radical and a monovalent $R_1$ radical wherein R is a polyhydric alcohol and $R_1$ can be a mono or polyhydric alcohol. The polyhydric alcohols are selected from the group consisting of saturated aliphatic alcohols having from 2 to 6 OH groups per molecule, and the monohydric alcohols are selected from the group consisting of saturated and unsaturated aliphatic, aromatic or phenolic hydroxyl alcohols having at least one carbon atom per molecule. By the use of the term polyborate esters are meant compounds whcih contain two or more boron atoms.

While the teaching of this invention is applicable to borates and to polyborates in general, particularly satisfactory results are achieved by using a borate having the formula:

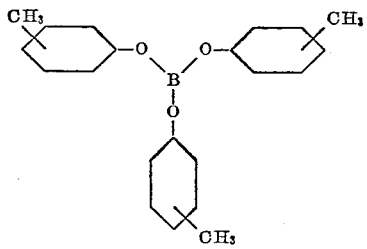

that is, tri-m,p-cresyl borate, and/or a polyborate ester having the formula shown below:

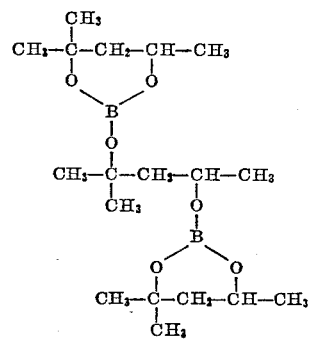

that is, trihexylene glycol biborate.

Equally satisfactory results are obtained using the following polyborates:

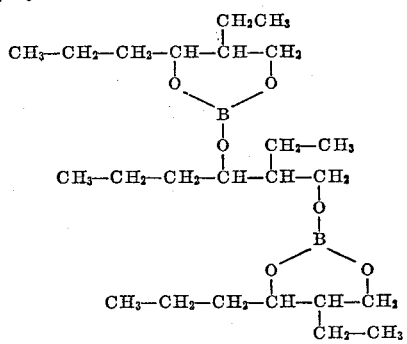

that is, tri (octylene glycol) biborate; and

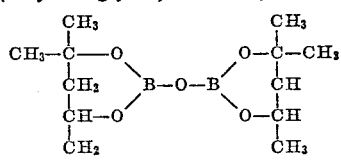

that is, hexylene glycol biborate.

The complex of the borate ester or polyborate ester and nitrogen coordinated boron compound will dissolve readily in liquid glycidyl polyether resin and epoxy-novolak resins to form homogeneous compositions. The resultant resin-catalyst mixture can be stored for several months at room temperature without any appreciable increase in viscosity. Solid epoxy resins and epoxy-novolak resins generally are dissolved in a solvent before the herein described liquid catalyst is added. It is a particularly important feature of this invention that when the catalyzed polyether mixture is subjected to elevated temperatures of from 60° C. to 200° C., and higher, the liquid glycidyl polyether-catalyst mixture readily reacts to form a hard, tough, cured resinous product. Such products exhibit low electrical losses over substantially all temperatures at which such apparatus operates.

Glycidyl polyethers and glycidyl polyether-novolaks catalyzed with the curing catalyst mixture of this invention are particularly suitable for electrical insulating applications. Thus, solutions of the glycidyl polyethers and glycidyl polyether-novolak and curing catalysts can be applied to electrical wires, cables, coils, windings and the like, as potting, impregnating and coating resins and varnishes. Upon being subjected to heat, any solvent that is present in the polyether or polyether-novolak curing catalyst mixture evaporates and the liquid polyether or polyether-novolak cures to a hard, tough resinous mass. These catalyzed glycidyl polyether and glycidyl polyether-novolak compositions can be employed also for potting and casting applications. Laminated magnetic cores, for example, can be dipped in such liquid compositions, using vacuum and pressure if necessary, and the composition will readily fill all the spaces between laminates. On heating, the composition between the laminations cures to a hard, tough, adhesive binder holding the laminations in position to produce a solid core which is extremely resistant to delamination and may be cut into core segments without rupture. Electrical transformers, rectifiers and electronic components of various kinds can be potted or cast within the completely reactive catalyzed glycidyl polyether compositions of this invention.

The compositions comprising the epoxy resins and/or the epoxy resin-novolaks in combination with the herein described curing catalyst provide excellent adhesive compositions. Thin coatings can be applied to metal, wood, porcelain, paper, plastics such as phenolic laminates, and when the coated surfaces are superimposed under moderate pressure and heated at temperatures of from 60° C. to 200° C. and higher, unusually good bonds are obtained.

Glycidyl polyethers and glycidyl polyether-novolaks which are cured using the catalysts of this invention can be admixed with solids, such as silica, titanium dioxide, zircon, zirconia, glass fibers, wood flour, mica, graphite and calcium silicate. In some instances small amounts up to 50% of the weight of the composition of other resins, such as phenolics, polyesters such as glycol maleates, and alkyd resins, can be admixed with the glycidyl polyethers and glycidyl polyether-novolaks in the practice of this invention.

The catalyst of this invention is prepared by admixing and/or blending at least one nitrogen coordinated boron compound and at least one borate ester and/or polyborate ester. The reaction between the components is quite exothermic and the liquid catalyst complex may become quite viscous on cooling.

More specifically, the catalyst suitable for use in accordance with this invention can be prepared by admixing and reacting from 1 mol to 3 mols of a nitrogen coordinated boron compound such as that of Example V, for example, and from 1 mol to 2 mols of a polyborate ester, for example, trihexylene glycol biborate or tri (octylene glycol) biborate or a borate ester such as tri-m,p-cresyl borate. While an attempt has been made to define the amount of catalyst employed in terms of mols, the important factor is that the nitrogen coordinated boron compound and the borate ester or polyborate ester are combined in such a ratio as to provide one atom of nitrogen per atom of boron in the finished catalyst complex.

The catalyst complex of this invention is cold blended with the glycidyl polyether or glycidyl polyether-novolak resin in such quantity as to constitute from 0.5% to 50% by weight and preferably from about 2% to 25% by weight based on the weight of the glycidyl polyether resin or the glycidyl polyether-novolak resin. If the glycidyl polyether resin or glycidyl polyether-novolak resin is a liquid, it is necessary only to admix the two physically. If, however, the epoxy resin or epoxy-novolak resin is a solid, one or two procedures can be followed in admixing the catalyst with the resin. One procedure is to heat the epoxy above its melting point and then admix the catalyst therein, or in the alternative, the resin can be dissolved in a suitable solvent for instance glycol monoethyl ether, methylisobutylketone, toluene and the catalyst admixed therewith.

In order to indicate more specifically the advantages and capabilities of the curing catalytic mixture of the present invention, the following specific examples are set forth. The parts given are by weight unless otherwise indicated.

Example VI

A liquid glycidyl polyether is prepared by introducing into a reaction vessel equipped with agitator, cooling and heating means, distillation condenser and receiver, 513 parts (2.25 mols) of bis-phenol "A" and 2081 parts (22.5 mols) of epichlorohydrin and 10.4 parts of water. A total of 188 parts of 97.5% sodium hydroxide, corresponding to 2.04 mols (2% excess) per mol of epichlorohydrin, is added in increments over several hours. The temperature in the vessel does not rise above 100° C. and is generally not above 95° C. After all the sodium hydroxide is added, the excess water and epichlorohydrin are removed by evacuating to an absolute pressure of 50 mm. of mercury at 150° C. The vessel is then cooled to 90° C. and 36 parts of benzene added, and then cooled further to 40° C. with salt precipitating from the solution. The solution is filtered to remove the salt, the salt being washed with 36 additional parts of benzene, the benzene washing out any polyether resin, and then adding to the filtrate and both returned to the vessel. The benzene is then distilled off, the polyether resin being heated at an increasing temperature until at 125° C., vacuum is applied and distillation is continued until the vessel contents are at 170° C. at 25 mm. of mercury absolute pressure. The glycidyl polyether had a viscosity of Z-3 on the Gardner-Holdt scale.

Example VII

This example illustrates the preparation of an epoxy-novolak resin in which the novolak was a condensate of paratertiary butylphenol and formaldehyde. 328 parts of the novolak resin was dissolved in 920 parts of epichlorohydrin and 5 parts of water. Small pellets of sodium hydroxide in an amount of 82 parts were divided into six portions of approximately equal weight. The first portion was added to the entire solution with stirring and the mixture was heated rapidly to about 80° C. Heating was then discontinued and the heat of reaction carried the temperature up to about 100° C. At ten-minute intervals, the remaining portions of sodium hydroxide were added while keeping the temperature at about 95° C. to 100° C. After addition of all the sodium hydroxide, the solution was stirred and refluxed for one hour. The epichlorohydrin and water then distilled off at atmospheric pressure to a kettle temperature of about 130° C. While still warming about 450 parts of benzene were added to the mixture and the precipitated sodium chloride was removed by filtration. The benzene was distilled off under vacuum up to a temperature of about 4 mm. of mercury, leaving 398 parts of epoxy-novolak resin. Equally satisfactory results can be obtained by substituting epibromohydrin for epichlorohydrin in preparing the epoxy of Example VII.

Example VIII

A liquid glycidyl polyether was prepared in accordance with the procedure described in Example VI except there was used 2.04 parts epichlorohydrin and 1 part bis-phenol "A".

The following examples are illustrative of catalysts for use in this invention.

Example IX

One mol of tri [2-aminoethanol] borate and two mols of tri-m,p-cresyl borate are thoroughly admixed and blended together in a blender. Upon completion of the exotherm, the complex is a clear, pale yellow homogeneous liquid.

Example X

One mol of tri [2-aminoethanol] borate and one mol of trihexylene glycol biborate are thoroughly blended together. After exotherm, a homogeneous liquid results that is clear and has a pale yellow color.

Example XI

One mol of tri [2-methylaminoethanol] borate and two mols of tri-m,p-cresyl borate are blended together to provide a homogeneous clear, pale yellow and viscous liquid after reaction is completed.

Example XII

One mol of tri [2-methylaminoethanol] borate and one mol of trihexylene glycol biborate are blended together to provide, after the exotherm, a clear yellow homogeneous liquid.

Example XIII

One mol of tri [2-dimethylaminoethanol] borate and two mols of tri-m,p-cresyl borate are blended together to provide, after the exotherm, a homogeneous clear yellow liquid.

Example XIV

One mol of tri [2-dimethylaminoethanol] borate and one mol of trihexylene glycol biborate are admixed and reacted to provide a clear yellow homogeneous liquid.

In the following examples all parts are by weight unless otherwise indicated.

Example XV

A mixture of 100 parts of the glycidyl polyether of Example IV and 19.2 parts of the catalyst of Example XI were admixed. The resultant mixture gelled in 60 minutes at 100° C., in 20 minutes at 135° C., and in 12 minutes at 150° C.

After being heated for 8 hours at 135° C., the electrical properties of the cured resin were as follows:

| Test Temp. | 100×tan α | | Dielectric Constant | |
|---|---|---|---|---|
| | 60 cy. | 1 kc. | 60 cy. | 1 kc. |
| 25 | 0.37 | 0.53 | 3.39 | 3.38 |
| 100 | 3.46 | 1.55 | 3.70 | 3.57 |
| 150 | 176.50 | 52.50 | 30.67 | 7.02 |

Example XVI

A mixture of 100 parts of the glycidyl polyether of Example IV and 13 parts of the catalyst of Example XII were admixed. The resultant mixture gelled in 60 minutes at 100° C., in 23 minutes at 135° C., and in 8 minutes at 150° C.

After being heated for 8 hours at 135° C., the electrical properties of the cured resin were as follows:

| Test Temp. | 100×tan α | | Dielectric Constant | |
|---|---|---|---|---|
| | 60 cy. | 1 kc. | 60 cy. | 1 kc. |
| 25 | 0.48 | 0.75 | 3.37 | 3.35 |
| 100 | 3.01 | 1.16 | 3.67 | 3.56 |
| 150 | 66.60 | 16.80 | 7.73 | 4.51 |

Example XVII

A mixture of 100 parts of the glycidyl polyether of Example IV and 10 parts of the catalyst of Example XIII were admixed. The resultant mixture gelled in 90 minutes at 100° C., in 15 minutes at 135° C., and in 8 minutes at 150° C. The pot life of the mixture was about 2 months.

After being heated for 8 hours at 135° C., the electrical properties of the cured resin were as follows:

| Test Temp. | 100×tan α | | Dielectric Constant | |
|---|---|---|---|---|
| | 60 cy. | 1 kc. | 60 cy. | 1 kc. |
| 25 | 0.51 | 0.65 | 3.40 | 3.39 |
| 100 | 1.08 | 0.69 | 3.59 | 3.52 |
| 150 | 34.62 | 8.44 | 5.17 | 4.25 |

Example XVIII

A mixture of 100 parts of the glycidyl polyether of Example IV and 11.7 parts of the catalyst of Example XIV were admixed. The resultant mixture gelled in 105 minutes at 100° C., in 25 minutes at 135° C., and in 8 minutes at 150° C.

After being heated for 8 hours at 135° C., the electrical properties of the cured resin were as follows:

| Test Temp. | 100×tan α | | Dielectric Constant | |
|---|---|---|---|---|
| | 60 cy. | 1 kc. | 60 cy. | 1 kc. |
| 25 | 0.69 | 0.90 | 3.59 | 3.52 |
| 100 | 2.11 | 0.96 | 3.77 | 3.75 |
| 150 | 41.23 | 9.21 | 5.38 | 4.29 |

Referring to the drawing, in FIG. 1 there is illustrated a transformer 10 comprising a core 12 comprised of any suitable metal such as steel, a coil 14 comprised of a suitable metal wire such as copper, silver aluminum and the like, and a resinous insulation 16 comprised of a heat-hardened glycidyl polyether resin cured by heating in the presence of the catalyst of this invention. Connections are made to the transformer through metal contacts 18 which pass from the coil 14, through the resinous insulation 16.

Referring to FIG. 2, there is illustrated a laminated article of manufacture 20 comprised of two sheets of electrical insulating material 22, such as kraft paper bonded together by a layer of adhesive 24 comprised of the catalyzed glycidyl polyether resin of this invention.

While the present invention has been described with reference to particular embodiments thereof, it will be understood that certain changes, modifications and substitutions may be made therein without departing from its scope.

I claim as my invention:

1. A boron- and nitrogen-containing catalyst adapted for the curing of a resin selected from the group consisting of glycidyl polyether resins, glycidyl polyether-novolak resins, and mixtures thereof comprising the product of reaction of (a) from 1 mol to 2 mols of at least one boron compound selected from the group consisting of (i) polyborate esters having a formula selected from the group consisting of

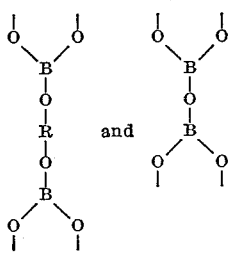

wherein the valence bonds at each end are satisfied by at least one radical selected from the group consisting of a bivalent R radical and a monovalent $R_1$ radical wherein R is selected from the group consisting of polyhydric alcohols having two hydroxyl groups removed and $R_1$ is selected from the group consisting of monohydric alcohols and polyhydric alcohols having one hydroxyl group removed, and (ii) borate esters having the formula:

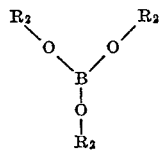

wherein $R_2$ is a radical selected from at least one of the group consisting of alkyl radicals, cycloalkyl radicals, and aryl radicals, and (b) from 1 mol to 3 mols of a nitrogen coordinated boron compound having the formula:

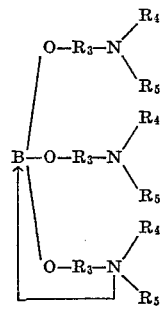

wherein $R_3$ is a bivalent radical selected from the group consisting of —$CH_2$—$CH_2$— and

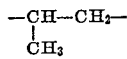

and $R_4$ and $R_5$ are selected from the group consisting of hydrogen, alkyl radicals, cycloalkyl radicals, and aryl radicals.

2. A boron- and nitrogen-containing catalyst adapted for the curing of resins selected from the group consisting of glycidyl polyether resins, glycidyl polyether-novolak resins, and mixtures thereof comprising the product of reaction of (a) about one mol of a polyborate ester having a formula selected from the group consisting of

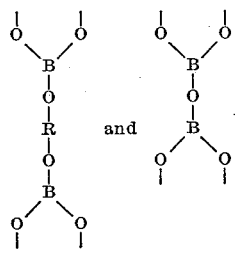

wherein the valence bonds at each end are satisfied by at least one radical selected from the group consisting of a bivalent R radical and a monovalent $R_1$ radical wherein R is selected from the group consisting of polyhydric alcohols having two hydroxyl groups removed and $R_1$ is selected from the group consisting of monohydric alcohols and polyhydric alcohols having one hydroxyl group removed, and (b) about one mol of a nitrogen coordinated boron compound having the formula:

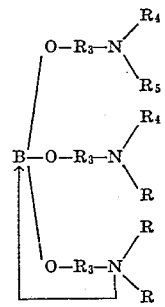

wherein R is a bivalent radical selected from the group consisting of —$CH_2$—$CH_2$— and

—CH—CH—
       |
      $CH_3$ and $R_4$ and $R_5$ are selected from the group consisting of hydrogen, alkyl radicals, cycloalkyl radical, and aryl radicals.

3. A boron- and nitrogen-containing catalyst adapted for the curing of resins selected from the group consisting of glycidyl polyether resins, glycidyl polyether-novolak resins, and mixtures thereof comprising the product of reaction of (a) about two mols of a borate ester having the formula:

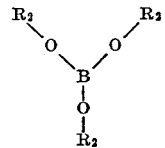

wherein $R_2$ is a radical selected from at least one of the group consisting of alkyl radicals, cycloalkyl radicals, and aryl radicals, and (b) about one mol of a nitrogen coordinated boron compound having the formula:

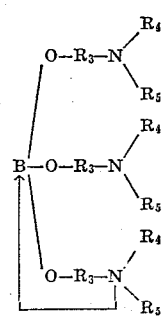

wherein $R_3$ is a bivalent radical selected from the group consisting of —$CH_2$—$CH_2$— and

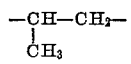

and $R_4$ and $R_5$ are selected from the group consisting of hydrogen, alkyl radicals, cycloalkyl radicals, and aryl radicals.

4. A boron- and nitrogen-containing catalyst adapted for the curing of resins selected from the group consisting of glycidyl polyether resins, glycidyl polyether-novolak resins, and mixtures thereof comprising the reaction product of (a) about one mol of tri [2-dimethylaminoethanol] borate and (b) about two mols of tri-m,p-cresyl borate.

5. A composition of matter adapted for the curing of resins selected from the group consisting of glycidyl polyether resins, glycidyl polyether-novolak resins, and mixtures thereof comprising the reaction product of (a) about one mol of tri [2-dimethylaminoethanol] borate and (b) about one mol of tri-hexylene glycol biborate.

6. A composition of matter comprising an admixture of (1) the reaction product derived by heating and reacting in the presence of alkali an epihalohydrin and at least one compound selected from the group consisting of dihydric phenols and the condensation product under acid conditions of a mononuclear monohydric alkyl phenol containing at least four carbon atoms in the alkyl group and an aldehyde selected from the group consisting of formaldehyde, acetaldehyde, chloraldehyde, propionaldehyde, butyraldehyde, and furfuraldehyde and (2) from 0.5% to 50% based on the weight of (1) of a curing catalyst comprised of the product of reaction of (a) from 1 mol to 2 mols of at least one boron compound selected from the group consisting of (i) polyborate esters having a formula selected from the group consisting of

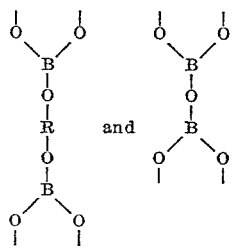

wherein the valence bonds at each end are satisfied by at least one radical selected from the group consisting of a bivalent R radical and a monovalent $R_1$ radical wherein R is selected from the group consisting of polyhydric alcohols having two hydroxyl groups removed and $R_1$ is selected from the group consisting of monohydric alcohols and polyhydric alcohols having one hydroxyl group removed, and (ii) borate esters having the formula:

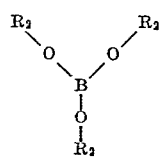

wherein $R_2$ is a radical selected from at least one of the group consisting of alkyl radicals, cycloalkyl radicals, and aryl radicals, and (b) from 1 mol to 3 mols of a nitrogen coordinated boron compound having the formula:

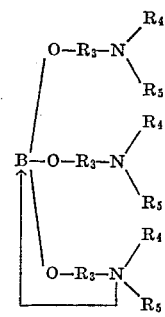

wherein $R_3$ is a bivalent radical selected from the group consisting of —$CH_2$—$CH_2$— and

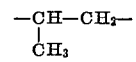

and $R_4$ and $R_5$ are selected from the group consisting of hydrogen, alkyl radicals, cycloalkyl radicals, and aryl radicals.

7. A composition of matter comprising an admixture of (1) the reaction product derived by heating and reacting in the presence of alkali an epihalohydrin and at least one compound selected from the group consisting of dihydric phenols and the condensation product under acid conditions of a mononuclear monohydric alkyl phenol containing at least four carbon atoms in the alkyl group and an aldehyde selected from the group consisting of formaldehyde, acetaldehyde, chloraldehyde, propionaldehyde, butyraldehyde, and furfuraldehyde and (2) from 0.5% to 50% based on the weight of (1) of a curing catalyst comprised of the product of reaction of (a) about one mol of a polyborate ester having a formula selected from the group consisting of

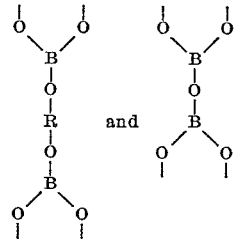

wherein the valence bonds at each end are satisfied by at least one radical selected from the group consisting of a bivalent R radical and a monovalent $R_1$ radical wherein R is selected from the group consisting of polyhydric alcohols having two hydroxyl groups removed and $R_1$ is selected from the group consisting of monohydric alcohols and polyhydric alcohols having one hydroxyl group removed, and (b) about one mol of a nitrogen coordinated boron compound having the formula:

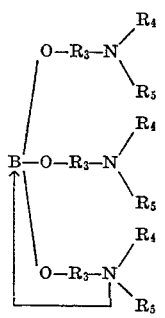

wherein $R_3$ is a bivalent radical selected from the group consisting of —$CH_2$—$CH_2$— and

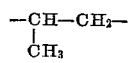

and $R_4$ and $R_5$ are selected from the group consisting of hydrogen, alkyl radicals, cycloalkyl radicals, and aryl radicals.

8. A composition of matter comprising an admixture of (1) the reaction product derived by heating and reacting in the presence of alkali an epihalohydrin and at least one compound selected from the group consisting of dihydric phenols and the condensation product under acid conditions of a mononuclear monohydric alkyl phenol containing at least four carbon atoms in the alkyl group and an aldehyde selected from the group consisting of formaldehyde, acetaldehyde, chloraldehyde, propionaldehyde, butyraldehyde, and furfuraldehyde and (2) from 0.5% to 50% based on the weight of (1) if a curing catalyst comprised of the product of reaction of (a) about two mols of a borate ester having the formula:

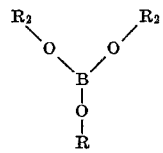

wherein $R_2$ is a radical selected from at least one of the group consisting of alkyl radicals, cycloalkyl radicals, and aryl radicals, and (b) about one mol of a nitrogen coordinated boron compound having the formula:

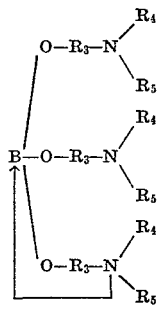

wherein $R_3$ is a bivalent radical selected from the group consisting of —CH$_2$—CH$_2$— and

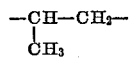

and $R_4$ and $R_5$ are selected from the group consisting of hydrogen, alkyl radicals, cycloalkyl radicals, and aryl radicals.

9. A composition of matter comprising an admixture of (1) the reaction product derived by heating and reacting in the presence of alkali an epihalohydrin and at least one compound selected from the group consisting of dihydric phenols and the condensation product under acid conditions of a mononuclear monohydric alkyl phenol containing at least four carbon atoms in the alkyl group and an aldehyde selected from the group consisting of formaldehyde, acetaldehyde, chloraldehyde, propionaldehyde, butyraldehyde, and furfuraldehyde and (2) from 0.5% to 50% based on the weight of (1) of a curing catalyst comprised of the product or reaction of (a) about one mol of tri[2-dimethylaminoethanol] borate and (b) about two mols of tri-m,p-cresyl borate.

10. A composition of matter comprising an admixture of (1) the reaction product derived by heating and reacting in the presence of alkali an epihalohydrin and at least one compound selected from the group consisting of dihydric phenols and the condensation product under acid conditions of a mononuclear monohydric alkyl phenol containing at least four carbon atoms in the alkyl group and an aldehyde selected from the group consisting of formaldehyde, acetaldehyde, chloraldehyde, propionaldehyde, butyraldehyde, and furfuraldehyde and (2) from 0.5% to 50% based on the weight of (1) of a curing catalyst comprised of the product of reaction of (a) about one mol of tri[2-dimethylaminoethanol] borate and (b) about one mol of tri-hexylene glycol borate.

11. A solid resinous composition comprising the hardened product derived by admixing and heating (1) the reaction product derived by heating and reacting in the presence of alkali an epihalohydrin and at least one compound selected from the group consisting of dihydric phenols and the condensation product under acid conditions of a mononuclear monohydric alkyl phenol containing at least four carbon atoms in the alkyl group and an aldehyde selected from the group consisting of formaldehyde, acetaldehyde, chloraldehyde, propionaldehyde, butyraldehyde, and furfuraldehyde and (2) from 0.5% to 50% based on the weight of (1) of a curing catalyst comprised of the product of reaction of (a) from 1 mol to 2 mols of at least one boron compound selected from the group consisting of (i) polyborate esters having a formula selected from the group consisting of

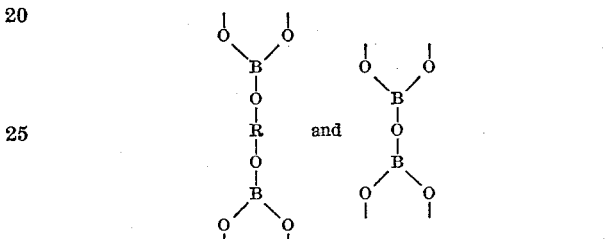

wherein the valence bonds at each end are satisfied by at least one radical selected from the group consisting of a bivalent R radical and a monovalent $R_1$ radical wherein R is selected from the group consisting of polyhydric alcohols having two hydroxyl groups removed and $R_1$ is selected from the group consisting of monohydric alcohols and polyhydric alcohols having one hydroxyl group removed, and (ii) borate esters having the formula:

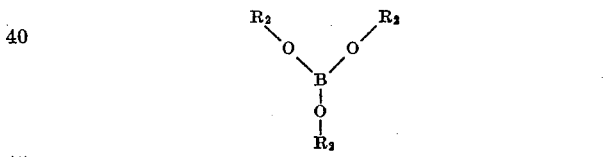

wherein $R_2$ is a radical selected from at least one of the group consisting of alkyl radicals, cycloalkyl radicals, and aryl radicals, and (b) from 1 mol to 3 mols of a nitrogen coordinated boron compound having the formula:

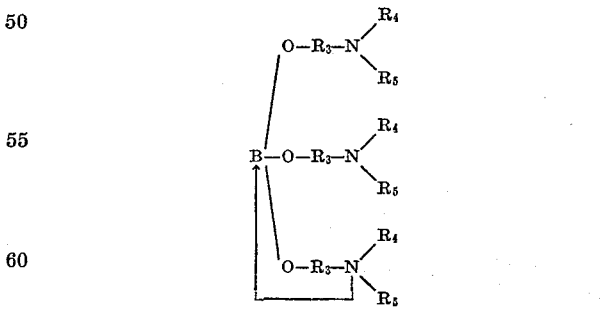

wherein $R_3$ is a bivalent radical selected from the group consisting of —CH$_2$—CH$_2$— and

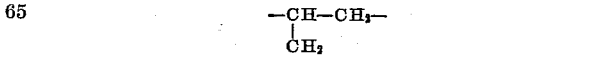

and $R_4$ and $R_5$ are selected from the group consisting of hydrogen, alkyl radicals, cycloalkyl radicals, and aryl radicals.

12. A solid resinous composition comprising the hardened product derived by admixing and heating (1) the reaction product derived by heating and reacting in the presence of alkali an epihalohydrin and at least one compound selected from the group consisting of dihydric phenols and the condensation product under acid conditions of a mononuclear monohydric alkyl phenol containing at least four carbon atoms in the alkyl group and an aldehyde selected from the group consisting of formaldehyde, acetaldehyde, chloraldehyde, propionaldehyde, butyraldehyde, and furfuraldehyde and (2) from 0.5% to 50% based on the weight of (1) of a curing catalyst comprised of the product of reaction of (a) about one mol of a polyborate ester having a formula selected from the group consisting of

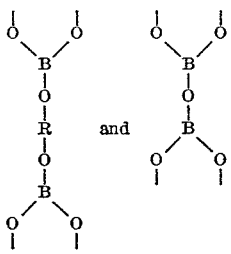

and wherein the valence bonds at each end are satisfied by at least one radical selected from the group consisting of a bivalent R radical and a monovalent $R_1$ radical wherein R is selected from the group consisting of polyhydric alcohols having two hydroxyl groups removed and $R_1$ is selected from the group consisting of monohydric alcohols and polyhydric alcohols having one hydroxyl group removed, and (b) about one mol of a nitrogen coordinated boron compound having the formula:

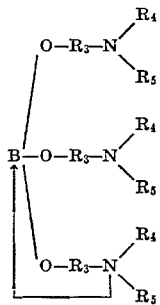

wherein $R_3$ is a bivalent radical selected from the group consisting of —$CH_2$—$CH_2$— and

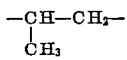

and $R_4$ and $R_5$ are selected from the group consisting of hydrogen, alkyl radicals, cycloalkyl radicals, and aryl radicals.

13. A solid resinous composition comprising the hardened product derived by admixing and heating (1) the reaction product derived by heating and reacting in the presence of alkali an epihalohydrin and at least one compound selected from the group consisting of dihydric phenols and the condensation product under acid conditions of a mononuclear monohydric alkyl phenol containing at least four carbon atoms in the alkyl group and an aldehyde selected from the group consisting of formaldehyde, acetaldehyde, chloraldehyde, propionaldehyde, butyraldehyde, and furfuraldehyde and (2) from 0.5% to 50% based on the weight of (1) of a curing catalyst comprised of the product of reaction of (a) about two mols of a borate ester having the formula:

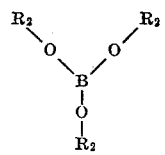

wherein $R_2$ is a radical selected from at least one of the group consisting of alkyl radicals, cycloalkyl radicals, and aryl radicals, and (b) about one mol of a nitrogen coordinated boron compound having the formula:

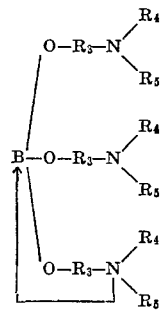

wherein $R_3$ is a bivalent radical selected from the group consisting of —$CH_2$—$CH_2$— and

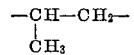

and $R_4$ and $R_5$ are selected from the group consisting of hydrogen, alkyl radicals, cycloalkyl radicals, and aryl radicals.

14. A solid resinous composition comprising the hardened product derived by admixing and heating (1) the reaction product derived by heating and reacting in the presence of alkali and epihalohydrin and at least one compound selected from the group consisting of dihydric phenols and the condensation product under acid conditions of a mononuclear monohydric alkyl phenol containing at least four carbon atoms in the alkyl group and an aldehyde selected from the group consisting of formaldehyde, acetaldehyde, chloraldehyde, propionaldehyde, butyraldehyde, and furfuraldehyde and (2) from 0.5% to 50% based on the weight of (1) of a curing catalyst comprised of the product of reaction of (a) about one mol of tri[2-dimethylaminoethanol]borate and (b) about two mols of tri-m,p-cresyl borate.

15. A solid resinous composition comprising the hardened product derived by admixing and heating (1) the reaction product derived by heating and reacting in the presence of alkali an epihalohydrin and at least one compound selected from the group consisting of dihydric phenols and the condensation product under acid conditions of a mononuclear monohydric alkyl phenol containing at least four carbon atoms in the alkyl group and an aldehyde selected from the group consisting of formaldehyde, acetaldehyde, chloraldehyde, propionaldehyde, butyraldehyde, and furfuraldehyde and (2) from 0.5% to 50% based on the weight of (1) of a curing catalyst comprised of the product of reaction of (a) about one mol of tri[2-dimethylaminoethanol]borate and (b) about one mol of tri-hexylene glycol biborate.

References Cited

Chem. Society Journal: London, pp. 820–822 (1946).
Chem. and Eng. News, 36, 112–13 (1958).
Lee et al., "Epoxy Resins," p. 15, July 7, 1957.

WILLIAM H. SHORT, *Primary Examiner.*

T. D. KERWIN, *Assistant Examiner.*